United States Patent

Krumm et al.

[11] Patent Number: 6,006,792
[45] Date of Patent: Dec. 28, 1999

[54] ROTATING LENO SELVAGE DEVICE WITH DIRECT ELECTROMAGNETIC DRIVE HAVING AXIAL MAGNETIC FLUX

[75] Inventors: Valentin Krumm, Hergensweiler; Horst Haeussler; Hans-Joachim Holz, both of Lindau, all of Germany

[73] Assignee: Lindauer Dornier Gesellschaft mbH, Lindau, Germany

[21] Appl. No.: 09/123,127

[22] Filed: Jul. 27, 1998

[30] Foreign Application Priority Data

Aug. 1, 1997 [DE] Germany ............................ 197 33 262

[51] Int. Cl.$^6$ .............................. D03C 7/04; H02K 7/08; H02K 7/14; H02K 11/00
[52] U.S. Cl. ................................. 139/54; 310/67
[58] Field of Search ...................... 139/54, 50; 310/67 R, 310/266–268

[56] References Cited

U.S. PATENT DOCUMENTS

| | | | |
|---|---|---|---|
| Re. 36,202 | 4/1999 | Hajec | ........................ 310/90 |
| 4,853,567 | 8/1989 | Muramatsu et al. | . |
| 5,518,039 | 5/1996 | Haeussler et al. | . |
| 5,524,678 | 6/1996 | Haeussler et al. | . |

FOREIGN PATENT DOCUMENTS

| | | |
|---|---|---|
| 0777004 | 6/1997 | European Pat. Off. . |
| 4405777 | 8/1995 | Germany . |
| 29713723 | 11/1997 | Germany . |
| 3261358 | 11/1991 | Japan . |

*Primary Examiner*—Andy Falik
*Attorney, Agent, or Firm*—W. F. Fasse; W. G. Fasse

[57] ABSTRACT

A rotating leno forming device includes a leno disk (3) that has leno thread guides (5) therein and that itself forms a part of the rotor (2) of an electromagnetic drive arrangement. In order to achieve a very compact structure, the components are so arranged to achieve an axially directed magnetic flux between the rotor (2) and an electromagnetic stator (10) arranged in the housing (8). A rolling contact bearing rotatably supports the leno disk (3), with a first bearing race (6A) connected to the housing (8) and a second bearing race (6B) connected to the leno disk (3). Permanent magnets (7) are arranged on an annular ring surface (3A) of the leno disk (3) extending along a radial plane, so as to face the electromagnetic stator (10) across an air gap (11) that extends on a radial plane. The thread guides (5) in the leno disk (3) face the stator (10) so that the leno threads (13A, 14A) constantly move through the air gap (11) preventing the accumulation of lint or fibers therein, during operation of the device. An iron yoke ring (3B) may be arranged to rotate with the leno disk (3) or to remain stationary with the stator (10), so as to provide a magnetic return or back circuit.

29 Claims, 5 Drawing Sheets

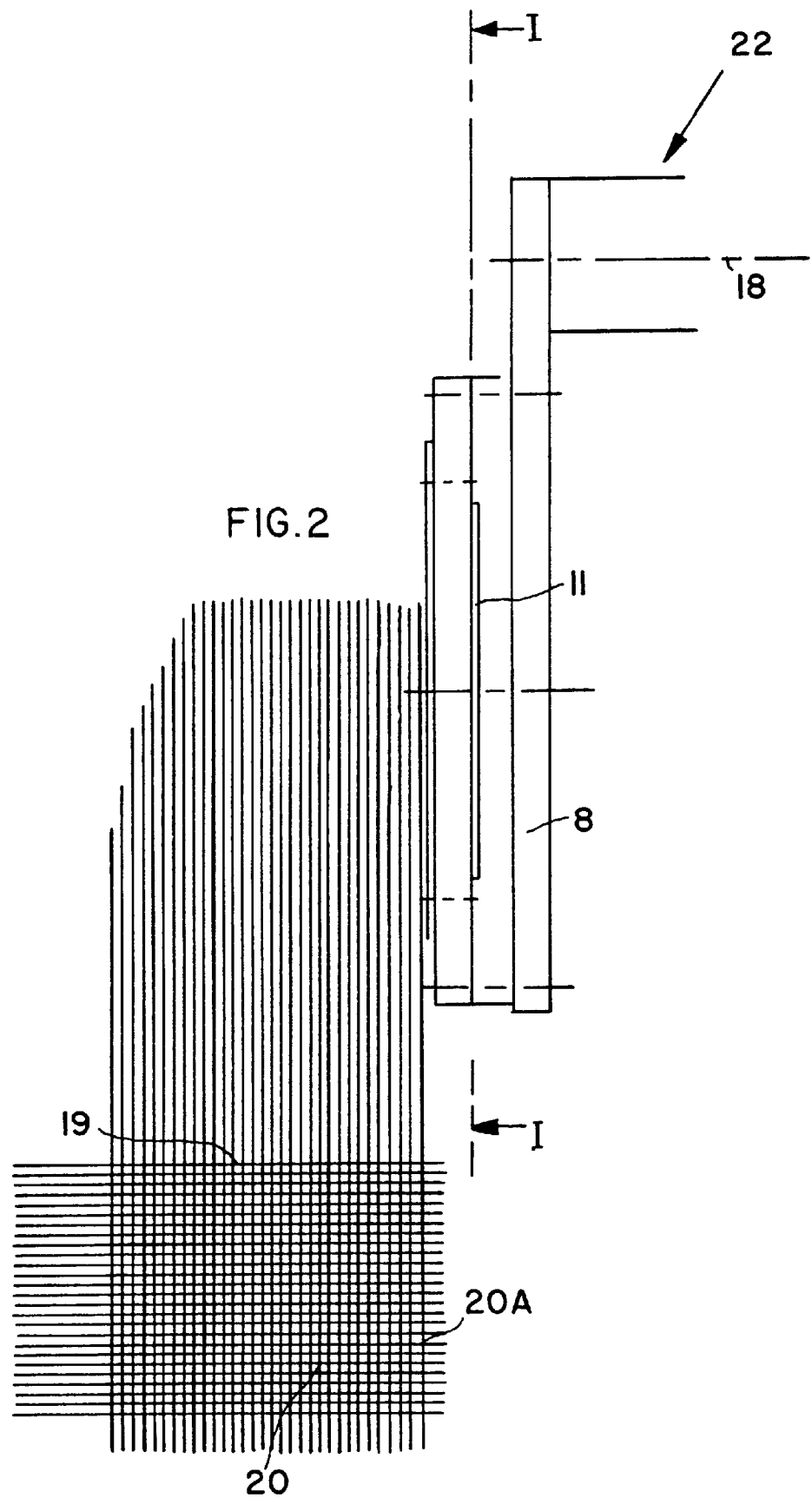

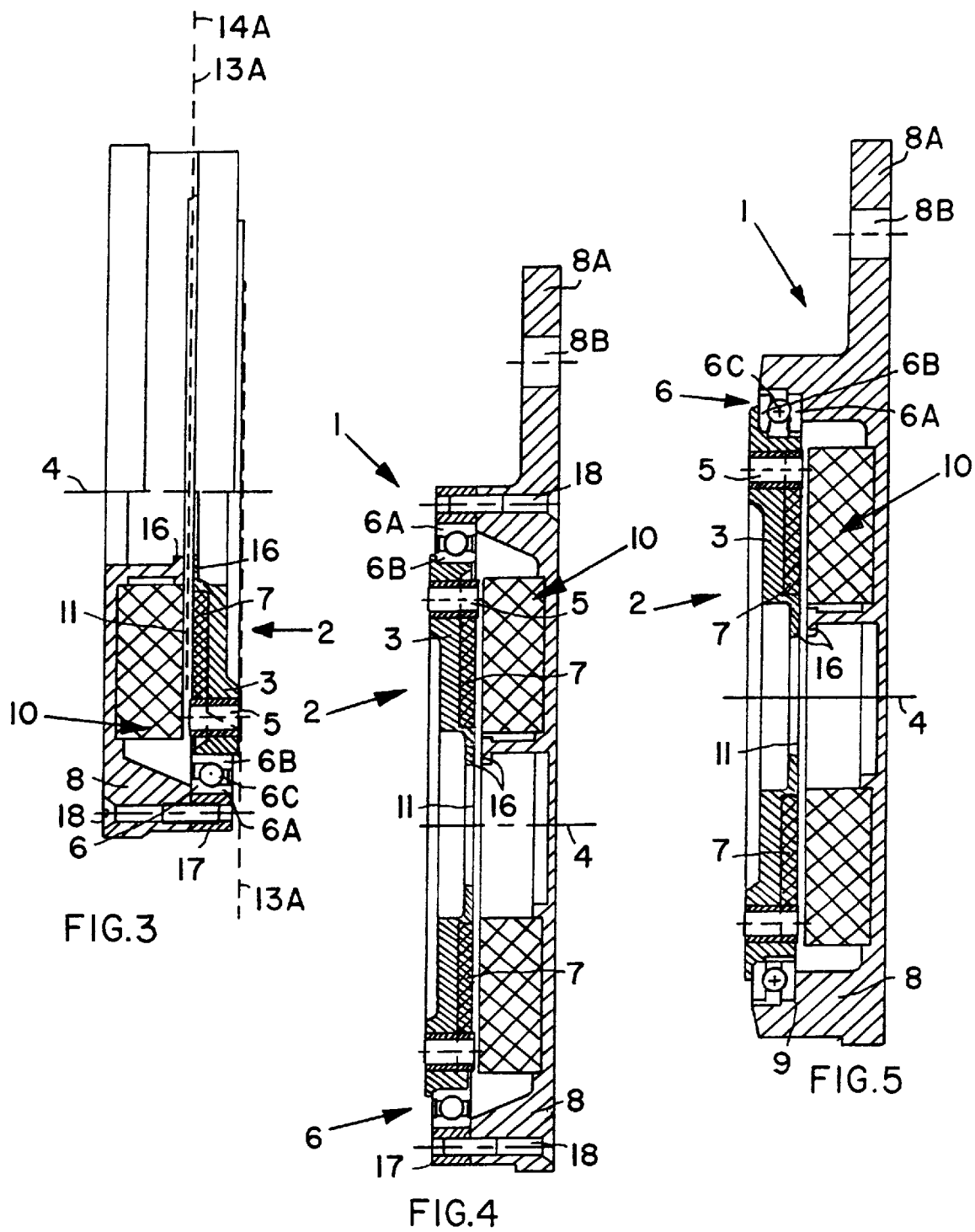

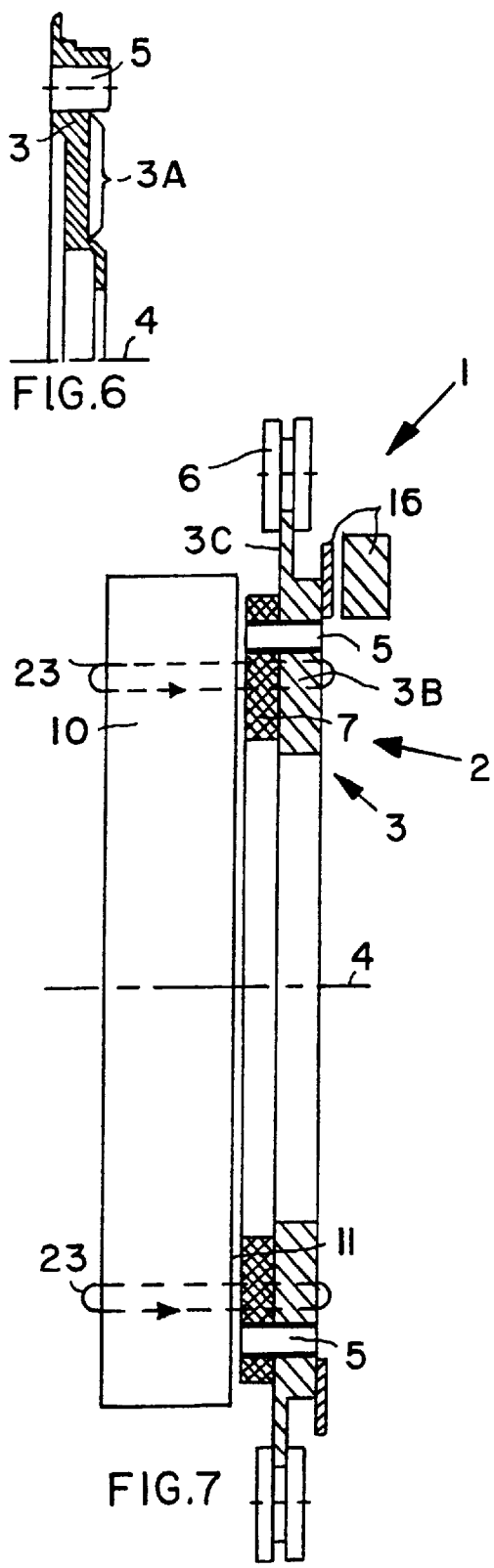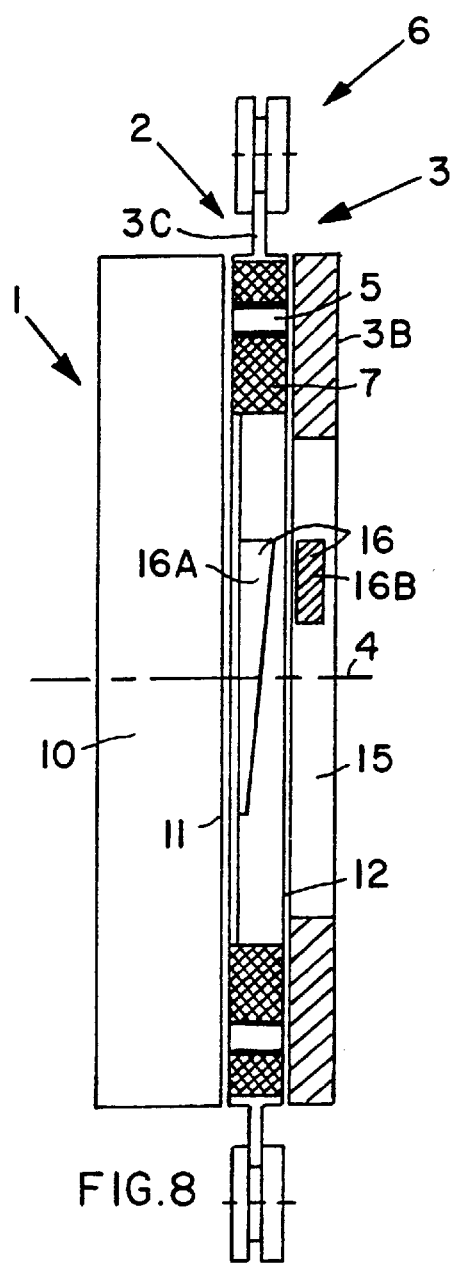

ROTATING LENO SELVAGE DEVICE WITH DIRECT ELECTROMAGNETIC DRIVE HAVING AXIAL MAGNETIC FLUX

PRIORITY CLAIM

This application is based on and claims the priority under 35 U.S.C. §119 of German Patent Application 197 33 262.5-26, filed on Aug. 1, 1997. The entire disclosure of German Patent Application 197 33 262.5-26 is incorporated herein by reference.

FIELD OF THE INVENTION

The invention relates to a rotating leno selvage forming device for a loom, and particularly a leno selvage device with an integral direct electromagnetic drive, which is adapted to carry out a full rotational leno binding of the weft threads along the edges of a woven web so as to form a durable selvage of high quality.

BACKGROUND INFORMATION

As shown schematically in present FIG. 9, German Patent 44 05 776 and corresponding U.S. Pat. No. 5,518,039 (Haeussler et al.) discloses a rotational leno selvage device 1 having a rotationally driven leno disk 3 that forms the rotor of an electric motor to provide a direct electromagnetic drive for the leno disk. The leno disk has 3 two thread guides 5 arranged symmetrically relative to the center axis 4 of the leno disk 3, whereby the two leno threads respectively supplied from two leno thread spools (not shown) are respectively guided through the two thread guides 5. The rotation of the leno disk opens and closes a leno shed for leno-binding the weft threads along the edge of the woven web.

With regard to the arrangement of the leno device, the above mentioned German Patent suggests that it is advantageous to arrange the leno disk with its rotation axis 4 parallel to the weft insertion direction, and with the leno disk spaced away from the binding point of the web at a necessary minimum distance. The electric motor, of which the leno disk forms the rotor, is for example an electrically actuatable servomotor or stepper motor or the like, that operates according to generally known principles using a radial magnetic flux 24' between magnets 7' of the rotor on the one hand and the stator 10' comprising windings 10B' mounted on a laminated metal stator body 10A' on the other hand. The motor windings 10B are thus carried by the stator while magnets 7 are arranged on the outer circumference of the iron body 3A of the rotor in a respective partial circular manner. The stator of the motor is received in a housing-like carrier member, (not shown) which forms a holder for connecting the leno device to the loom.

While the known leno device disclosed in the above mentioned German and U.S. Patent references has been found to be very effective for achieving its stated objects, it has additionally been found to be desirable to provide an improved bearing support for the leno disk forming the rotor of the motor, and to provide a system for accurately sensing and measuring the respective angular position of the leno disk at all times. The above mentioned German and U.S. patent references do not disclose the specific details of the bearing support arrangement for the leno disk and for determining its rotational or angular position.

SUMMARY OF THE INVENTION

In view of the above, it is an object of the invention to provide a rotating leno selvage forming device in which the leno disk that guides the leno threads forms the rotor of an electromagnetic drive motor, which achieves an overall compact and narrow construction of the leno device by using a magnetic flux between the stator and the rotor that deviates from the typical radial magnetic flux. The invention further aims to avoid or overcome the disadvantages of the prior art, and to achieve additional advantages, as apparent from the present description.

The above objects have been achieved in a rotating leno selvage forming device according to the invention comprising a housing adapted to be connected to the loom, a motor stator arranged in the housing, and a leno disk having two thread guides arranged symmetrically about its center axis. The leno disk is rotatably supported in the housing and forms a major component of the rotor of the electromagnetic drive motor. The electromagnetic components, e.g. the stator and the permanent magnets provided on the rotor, as well as a magnetic back circuit yoke that may be provided, are arranged in such a manner that an axially directed magnetic flux will arise between the rotor and the stator. This arrangement of the electromagnetic drive of the rotating leno device so as to generate an axial magnetic flux between the rotor and the stator is the key feature of the invention.

According to further embodiment details of the invention, the leno disk, which forms a major part of the rotor of the electro-magnetic drive motor, is rotatably supported by a bearing arrangement that is rigidly connected to the stator housing, whereby the rotation axis of the leno disk corresponds to the center axis of the overall leno device. The bearing arrangement comprises a rolling contact bearing including two bearing rings or races, whereby the leno disk is rigidly connected to a first bearing race, while the second bearing race is directly or indirectly connected to the housing. The rolling contact bearing may be a ball bearing or roller bearing or the like, configured as an axial bearing or as a radial bearing. In the case of an axial bearing, the leno disk is rigidly connected to the radially inner bearing race and the radially outer bearing race is rigidly connected to the housing either directly or via a mounting ring. In the case of a radial bearing, the leno disk is rigidly connected to the axially outer bearing race, while the axially inner bearing race (i.e. the bearing race axially adjacent the housing) is rigidly connected to the housing, for example by means of a centering holder.

Further according to the invention, a plurality of individual permanent magnets are arranged and carried on a circular surface of the leno disk facing the stator, whereby each permanent magnet respectively extends over a circular arc on the circular surface. The rotor thus comprises the leno disk, the rotating race of the bearing arrangement, and the permanent magnets, which all rotate together. The stator, which for example includes a core and stator windings on the core, is arranged in the housing while maintaining an air gap between the permanent magnets and the stator. Specifically, the air gap is formed along a radially extending plane, and the stator and the rotor magnets face each other axially across the gap, so that an axially directed magnetic flux spans across the air gap between the permanent magnets and the stator.

According to a particularly simple embodiment of the leno device according to the invention, the leno disk comprises an annular iron ring providing a magnetic back circuit or return circuit, i.e. a magnetic yoke. In a further embodiment, the leno disk forming the rotor comprises an annular metal ring, and particularly a steel ring, and the device further comprises an iron yoke disk that is secured rigidly to the stator and provides a magnetic back circuit or return circuit. The steel ring of the leno disk is arranged rotatably between the stator and the iron yoke disk. A respective plurality of permanent magnets are arranged on and carried by an annular surface of the steel ring of the leno disk, so that the magnets respectively face the stator and the iron yoke disk, and whereby the magnets are respectively arranged in a partial circular manner.

In order to determine the respective angular position of the rotor or particularly the leno disk, the rotating leno device according to the invention further includes an absolute path distance or rotational angle measuring system for detecting a rotational angular position of the rotor. By providing this system, it is possible to ensure that the leno disk can be properly positioned at a predefined angular position directly after switching on the loom, and furthermore the rotation of the leno disk for carrying out the leno shedding can be controlled synchronously with the main shed formation carried out by the shedding apparatus of the loom. The particular details of the construction and operation of the measuring system can be carried out according to any teachings of the prior art. Such details are not described here, but are well known to persons of ordinary skill in the art.

BRIEF DESCRIPTION OF THE DRAWINGS

In order that the invention may be clearly understood, it will now be described in connection with example embodiments, with reference to the drawings, wherein:

FIG. 2 is a schematic side view of the rotating leno device according to FIG. 1 arranged along the right edge of the woven web, and seen in a direction opposite the weaving direction;

FIG. 3 is a schematic partial sectional view of the rotating leno device of FIG. 1, taken along the line III—III in FIG. 1;

FIG. 4 is a schematic sectional view of a rotating leno device according to a first varied embodiment of the rotor bearing arrangement, as seen along the section line IV—IV in FIG. 1;

FIG. 5 is a schematic sectional view of a rotating leno device according to a second varied embodiment of the rotor bearing arrangement, as seen along the section line IV—IV in FIG. 1;

FIG. 6 is a schematic partial sectional view of the leno disk of the embodiment according to FIG. 4;

FIG. 7 is a schematic sectional view of a further varied embodiment of the rotating leno device according to the invention, including a rotating iron yoke providing a magnetic back circuit;

FIG. 8 is a schematic sectional view similar to that of FIG. 7, but showing a further embodiment in which the iron yoke is stationary and connected to the stator;

DETAILED DESCRIPTION OF PREFERRED EXAMPLE EMBODIMENTS AND OF THE BEST MODE OF THE INVENTION

Figure 1:
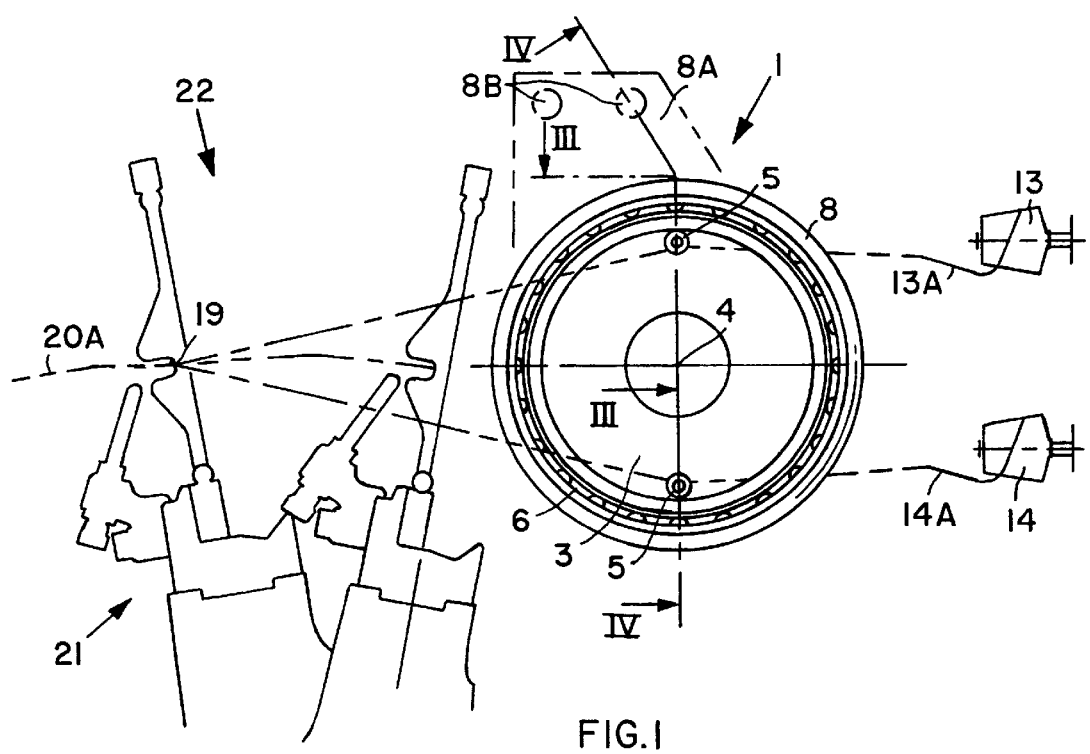
FIG. 1 is a schematic elevational view of the arrangement of a rotating leno device according to the invention relative to the binding point of a woven web in a loom, as seen along the plane I—I shown in FIG. 2.
Figure 9:
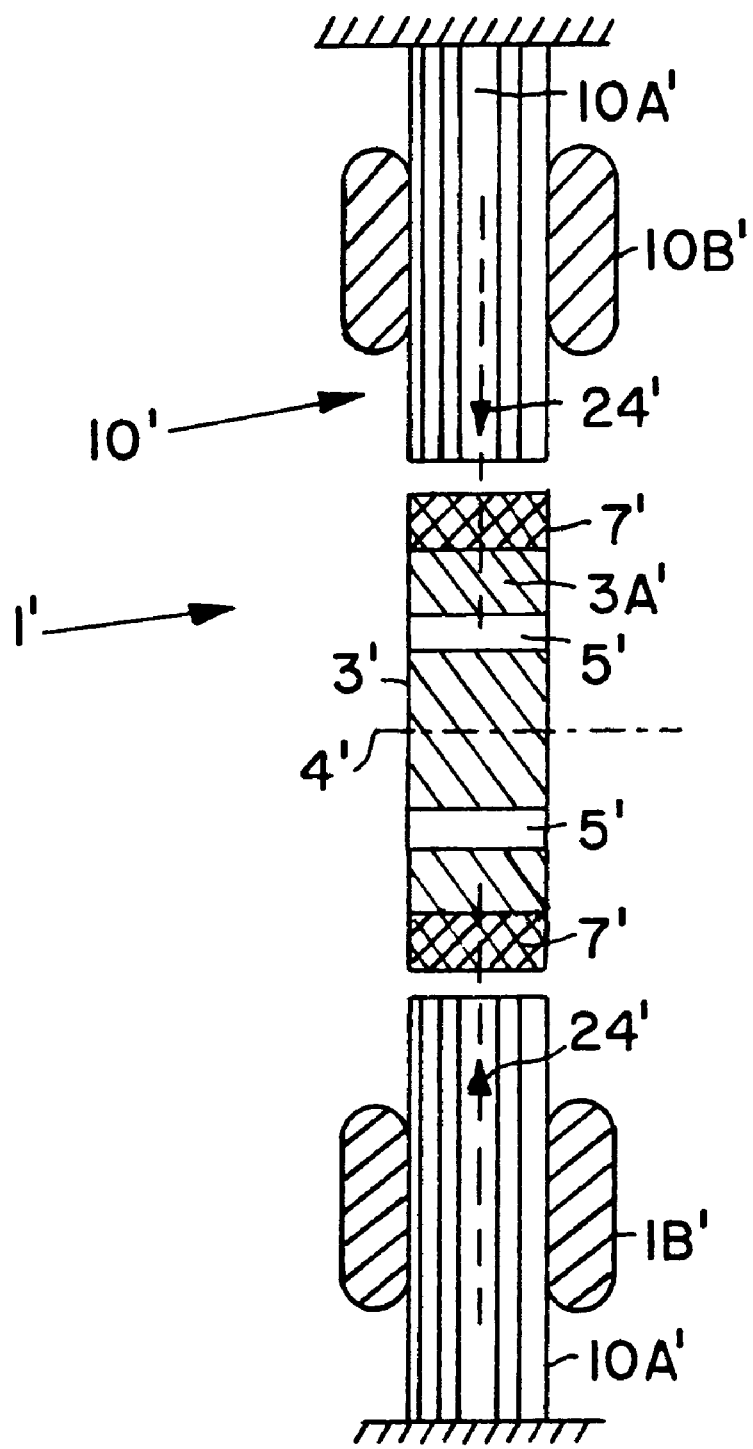
FIG. 9 is a schematic sectional view showing the prior art arrangement with a radially directed magnetic flux.

FIG. 1 shows a rotating leno device 1 according to the invention in a schematic elevational view, along the plane I—I in FIG. 2. The leno device 1 comprises a housing 8 in which the stator 10 of a direct electromagnetic drive is arranged, especially as shown in FIGS. 3, 4 and 5. A leno disk 3 having leno thread guides 5 therein, which forms a major part of the rotor 2 of the electromagnetic drive, is received at least partially in and protrudes from the housing 8. The leno disk 3 is connected to one bearing race of a rolling contact bearing 6, while the other bearing race thereof is connected to the housing 8, as will be described in detail below. An extension 8A or bracket having bored holes 8B therein protrudes from the main body of the housing 8 and enables the leno device 1 to be mounted on the loom 22.

In the illustrated arrangement, the leno device 1 is positioned at a relatively small spacing distance away from the binding point 19 of the woven web 20 being woven on the loom 22. As further shown in FIG. 1, the loom 22 includes various conventional apparatus 21 for carrying out the weaving. The specific details of the apparatus 21 will not be described here, because they are well known to persons of ordinary skill in the art and they do not form an essential part of the invention.

The loom 22 further includes at least two leno thread spools 13 and 14 that supply leno threads 13A and 14A respectively to the two leno thread guides 5 of the leno disk 3 of the leno device 1. The two leno threads 13A and 14A pass through the thread guides 5 and come together at the binding point 19 of the woven web 20 in order to form the firmly bound-in leno selvage 20A. In this context, each leno thread spool 13 and 14 may be mounted at a fixed location on the loom so as to be rotatable about a respective rotation axis. Alternatively, both leno spools 13 and 14 may be mounted so that they are both driven together to revolve about a common axis in the manner of a carousel in addition to each spool respectively rotating about its own rotation axis. The choice of whether to use a common revolving drive for the two leno spools 13 and 14 depends on whether the rotating leno device will be operated with the leno disk rotating in only one rotation direction or with the leno disk successively rotating in reverse or opposite rotation directions.

FIG. 2 shows the narrow and compact construction of the rotating leno device 1 according to the invention, for forming a securely bound-in selvage 20A along an edge of the woven web 20, whereby the weft threads 19 are firmly bound-in by the leno threads 13A and 14A. As seen in a direction opposite the weaving direction, the presently illustrated rotating leno device 1 is arranged along the right side edge of the woven web 20 in the loom 22. The connection of the leno device 1 to the loom 22 is simply represented schematically by the housing 8 and the axis of a screw or bolt 18.

FIG. 3 is a partial sectional view, on an enlarged scale in comparison to FIGS. 1 and 2. Specifically, FIG. 3 shows a partial section of the rotating leno device 1 along the line III—III in FIG. 1, showing the housing 8, with the stator 10 arranged therein, and with the rotor 2 arranged at least partially therein. In this embodiment, the rotor 2 includes the leno disk 3 with the leno thread guides 5, a plurality of permanent magnets 7 arranged around an annular or ring surface 3A of the leno disk 3 (as also shown in FIG. 6), a measurement or detection system 16, and the inner bearing race 6B of the rolling contact bearing 6. In this embodiment, the bearing 6 is an axial bearing 6, including two coaxial bearing races, namely a radially outer race 6A and a radially inner race 6B with balls or rollers 6C arranged therebetween in any known manner. The radially outer bearing race 6A of the rolling contact bearing 6 is received in or connected to the stator housing 8 to prevent relative rotation therebetween, by means of a mounting ring 17 and a plurality of screws or bolts 18 that connect the mounting ring 17 to the housing 8. With this arrangement, the rotor 2 is rotatably supported within the stator housing 8 so as to be able to rotate about the center axis 4. The measurement or detection system 16 includes at least one signal emitter 16A and preferably a plurality of signal receivers 16B arranged to detect or sense the position of the one or more signal emitters 16A.

An air gap 11 exists in the axial direction between the rotor 2 and the stator 10. This air gap 11 is at least large enough so that the leno threads 13A and 14A are able to move freely through this air gap 11 during operation of the device. Namely, these threads extend through the thread guides 5 as shown in FIG. 3, and the thread guides 5 open into the air gap 11 facing the side of the stator 10, such that the threads 13A and 14A run through the air gap 11 as shown in FIG. 3. The threads keep the air gap 11 clear of fly lint and the like, and thus provide a self-cleaning function for the air gap. Also, in view of this arrangement with the air gap 11 on a radially extending plane between the magnets 7 of the rotor 2 and the electromagnetic stator 10, a magnetic flux is generated in the axial direction, i.e. parallel to the center axis 4, across the air gap 11.

FIGS. 4 and 5 are sectional views showing the rotational leno device 1 along the section line IV—IV in FIG. 1. The embodiment shown in FIG. 4 substantially corresponds to that shown and described above in connection with FIG. 3, and especially with regard to the structure and arrangement of the rotor 2 within the housing 8. In this embodiment of FIG. 4, the bearing 6 is an axial bearing 6 having a first radially outer race 6A and a second radially inner race 6B arranged coaxially and radially within the outer race 6A, with rollers or balls 6C provided between the two races in the gap therebetween, which is a cylindrical annular gap. Each bearing race 6A and 6B is in the form of an axially extending cylindrical shell. The outer race 6A is rigidly connected to the housing 8 by a mounting ring 17 and bolts 18.

In contrast, FIG. 5 shows a different embodiment, using a different type of rolling contact bearing 6, and a different connection of the bearing to the housing 8, in comparison to the embodiment of FIGS. 3 and 4. Namely, in FIG. 5, the bearing 6 is a radial bearing, wherein each bearing race 6A and 6B is in the form of a radially extending annular ring or disk, with balls or rollers 6C received in the gap therebetween, which extends along a radial plane. The leno disk 3 is rigidly connected to the second or axially outer bearing race 6B, while the axially inner race 6A is rigidly connected to the housing 8. In this context, it should be understood that the terms "inner" and "outer" refer to the relative or sequential arrangement of the bearing races within a receiving recess in the housing 8. Thus, the inner bearing race is arranged inwardly toward the housing in the receiving recess, while the outer bearing race is arranged outwardly exposed in the receiving recess. The receiving recess forms a centering holder 9 in which the inner race 6A is secured against rotation relative thereto. The connection or securing of the bearing races respectively to the leno disk 3 and to the housing 8 can be carried out in any conventional manner.

In both FIGS. 4 and 5, the schematically illustrated rotational angle detection system 16, for example includes a signal emitter 16A connected to the rotor 2 and a signal receiver 16B rigidly connected to the housing 8. This detection system 16 serves to detect or identify the angular position of the rotor at any given time. First of all, this system makes it possible to properly position the rotor to a defined angular position directly after switching on the loom, and secondly this system makes it possible to control the formation of the leno shed by the rotating leno device synchronously with the formation of the main loom shed by the shedding apparatus of the loom.

FIG. 6 shows a detail sectional view of a portion of the leno disk 3 with its leno thread guide 5, as an individual component separated from the leno device 1 for clarity. FIG. 6 shows the annular ring surface 3A of the leno disk 3 extending on a radial plane. The permanent magnets 7 are arranged on this annular ring surface 3A in a respective circular arc manner, as shown and described above in connection with FIGS. 3 to 5. These magnets 7 form the poles for electromagnetically interacting with the stator 10.

FIG. 7 shows a further varied embodiment of a rotating leno device 1 equipped with a rotating iron yoke to provide a magnetic return or back circuit. In this embodiment, the leno disk 3 includes a metal ring 3C, and particularly a steel ring 3C, that is rotatably supported along its outer circumference by a bearing 6. An iron yoke ring 3B is connected to the inner circumference of the metal ring 3C, whereby the term "connected to" also covers the situation in which the two members are integrally formed with one another. A plurality of permanent magnets 7 are arranged in respective partial circular arc fashion on the stator-facing annular ring surface of the iron yoke ring 3B.

Thus, in FIG. 7, the metal ring 3C, the iron yoke ring 3B, the permanent magnets 7, and a rotating part of the bearing 6 together form the rotor 2 of the electromagnetic drive arrangement. This rotor 2 is arranged to be rotatable about the common center axis 4 of the rotor 2 and stator 10, whereby the rotor 2 is arranged axially adjacent and spaced apart from the stator 10 by a sufficient air gap 11 for allowing movement of the leno threads 13A and 14A through this air gap 11. An axially directed magnetic flux 23 is generated across the air gap 11, which extends along a radial plane, between the magnets 7 and the stator 10. In order to guidingly receive the leno threads 13A and 14A, the thread guides 5 are arranged in the leno disk 3 analogously as described above in connection with FIGS. 3 to 6. Particularly in the arrangement of FIG. 7, the thread guides 5 respectively pass through the iron yoke ring 3B and the magnets 7, or alternatively the thread guides 5 may pass through the yoke ring and between respective adjacent magnets 7. The air gap 11 must be sufficiently large for allowing movement of the leno threads 13A and 14A therethrough, because the open ends of the thread guides 5 face against the stator 10.

Once again, the leno device 1 is fitted with an angular position detection system 16 including signal emitters arranged on the rotor and at least one signal receiver comprising a sensor non-rotatably fixed to the housing (not shown in FIG. 7 for clarity).

The signal emitter may, for example be in the form of a swash plate or wobble disk, as will be described further below.

FIG. 8 shows an alternative embodiment of a rotating leno device 1 having an iron yoke 15 for providing a magnetic return or back circuit, which is stationarily connected to the stator. In this embodiment, the leno disk 3 comprises a metal ring 3C and particularly a steel ring 3C, which is rotatably supported around its outer circumference by a bearing 6, and a plurality of respectively circular arc-shaped permanent magnets 7 arranged around an inner circumference on an inwardly facing cylindrical surface of the metal ring 3C. The leno disk 3 is arranged between and axially aligned with the stator 10 and an iron yoke disk 15 that is stationarily connected to the stator 10 through the housing 8 (not shown), such that the permanent magnets 7 respectively face and are positioned adjacent the stator 10 and the iron yoke disk 15, which provides a magnetic return or back circuit.

In order to guidingly receive the leno threads 13A and 14A, respective thread guides 5 are provided in the leno disk 3 in a manner generally analogous to that described above in connection with FIGS. 3 to 6. In the present embodiment, the thread guides 5 penetrate through the respective permanent magnets 7. The leno disk 3, the stator 10 on one side of the leno disk 3, and the iron yoke disk 15 on the other side of the leno disk 3 are arranged axially aligned and spaced apart adjacent one another, whereby the leno disk 3, thread guides 5, and magnets 7 forming the rotor 2 are rotatable about the center axis 4. A respective air gap 11 and 12 is formed between the leno disk 3 and the stator 10 on the one hand, and between the leno disk 3 and the iron yoke disk 15 on the other hand, with a sufficient gap spacing to provide a space for the motion of the leno threads 13A and 14A that are directed through the thread guides 5.

In order to determine or detect the angular position of the leno disk 3 in the present embodiment, an angle detection system 16 is integrated into the present rotating leno device 1 as schematically illustrated in FIG. 8. This detection system 16 is, for example, an absolute measuring system, comprising at least two inductive sensors functioning as signal receivers 16B arranged off-center (i.e. spaced away from the axis) on the stationary iron yoke disk 15, and a disk 16A that is arranged to rotate together with the rotor 2 and functions as a signal emitter 16A. The disk 16A is so embodied that it provides a camming or ramping surface, or a wobbling motion relative to the signal receiver 16B. Thus, during each rotation of the rotor 2 or leno disk 3, the axial spacing between the signal emitter disk 16A and the inductive signal receivers 16B varies progressively and cyclically between a minimum value and a maximum value, responsive to the varying axial position of the surface of the disk 16A as the rotor rotates. As a result, the signal receivers 16B can provide a correspondingly varying output value, which thus definitively relates to the respective angular rotational position of the leno disk 3.

The above described embodiments of the rotating leno device according to the invention all have a narrow construction, particularly having a width of less than 25 mm. Therefore, it is possible to install the present leno devices in tight or relatively inaccessible areas of modern looms, and particularly in the area of the front or forward shed, where relatively difficult or disadvantageous space conditions prevail. The bearing support of the rotor is simple and easily installable and maintainable, yet still robust with regard to the bearing support of both radially and axially effective forces. Furthermore, the danger that the air gaps will become blocked or plugged by lint or fibers or the like is very small, since the air gaps are constantly cleared due to the motion of the leno threads there-through. The present leno device arrangement thus provides for a self cleaning feature. In connection with the narrow and compact structure, a further particular advantage is that the leno disk or rotor can be embodied with a relatively low mass. As a result, the rotor has a relatively low moment of inertia, such that the rotor is very well suited to carrying out rapid reversals of rotation direction within a few milliseconds, e.g. less than ten milliseconds, from a rotational speed of approximately 750 r.p.m. in one direction to a rotational speed of 750 r.p.m. in the opposite direction, for example.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A leno selvage device for a loom, comprising:
   a housing adapted to be connected to the loom;
   an electromagnetic stator secured to said housing; and
   a rotor including a leno disk and having at least one leno thread guide adapted to guidingly receive at least one leno thread therein, wherein said rotor is rotatably supported relative to said housing;
   wherein said rotor and said stator are so arranged relative to each other that an axially directed magnetic flux will be generated between said rotor and said stator when said stator is energized and said rotor rotates.

2. The leno selvage device according to claim 1, wherein said rotor and said stator are arranged axially adjacent and spaced apart from one another so as to form an axial air gap extending along a radial plane between said rotor and said stator.

3. The leno selvage device according to claim 1, wherein said rotor and said stator are arranged so as to form an air gap therebetween having a sufficient gap spacing so as to be adapted to have the at least one leno thread extend and move through said air gap.

4. The leno selvage device according to claim 3, further in combination with said at least one leno thread respectively extending through said at least one leno thread guide and through said air gap.

5. The leno selvage device according to claim 1, wherein said leno disk comprises an annular iron ring providing a magnetic back circuit.

6. The leno selvage device according to claim 5, wherein said annular iron ring has an annular ring surface extending along a radial plane and facing said stator, and wherein said rotor further comprises a plurality of permanent magnet segments that each have a circular arc shape and that are arranged on said annular ring surface along a circle.

7. The leno selvage device according to claim 1, further comprising a rolling contact bearing connected to said housing, wherein said leno disk is rotatably supported in said rolling contact bearing.

8. The leno selvage device according to claim 7, wherein said rolling contact bearing comprises a first bearing race that is secured to said housing so as to prevent relative rotation therebetween, and a second bearing race secured to said leno disk so as to be rotatable therewith.

9. The leno selvage device according to claim 8, wherein said rotor comprises said leno disk and said second bearing race, and further comprises a plurality of permanent magnets arranged on said leno disk facing said stator, wherein said leno disk, said magnets and said second bearing race are all fixed together so as to be rotatable together.

10. The leno selvage device according to claim 8, wherein said rolling contact bearing is a radial bearing, said first and second bearing races are axially aligned and axially spaced apart adjacent one another with a bearing gap extending along a radial plane between said first and second bearing races, and said rolling contact bearing further comprises a plurality of rollers or balls received in said bearing gap between said first and second bearing races.

11. The leno selvage device according to claim 8, wherein said rolling contact bearing is an axial bearing, said first bearing race secured to said housing is a radially outer bearing race, said second bearing race secured to said leno disk is a radially inner bearing race that is arranged coaxially and radially within said radially outer bearing race, a cylindrical bearing gap exists between said radially inner and outer bearing races, and said rolling contact bearing further comprises a plurality of rollers or balls received in said bearing gap between said radially inner and outer bearing races.

12. The leno selvage device according to claim 1, further comprising an iron yoke disk secured rigidly and stationarily relative to and spaced axially apart from said stator, wherein said leno disk comprises an annular metal ring rotatably arranged between said stator and said iron yoke disk, and said rotor further comprises a plurality of respectively circular arc shaped permanent magnets arranged on an annular surface of said annular metal ring so that said magnets respectively f ace said stator and said iron yoke disk.

13. The leno selvage device according to claim 12, wherein said annular surface of said annular metal ring is a radially inwardly facing cylindrical surface of said annular metal ring, and said iron yoke disk provides a magnetic back circuit.

14. The leno selvage device according to claim 12, wherein a first axially spaced air gap exists between said stator and said rotor, a second axially spaced air gap exists between said iron yoke disk and said rotor, and said first and second air gaps each respectively have a sufficient gap spacing so as to be adapted to have the at least one leno thread extend and move through said first and second air gaps.

15. The leno selvage device according to claim 14, further in combination with said at least one leno thread respectively extending through said first air gap, said at least one leno thread guide, and said second air gap.

16. The leno selvage device according to claim 14, wherein said at least one leno thread guide passes through at least one of said magnets in an axial direction and opens respectively into said first and second air gaps.

17. The leno selvage device according to claim 12, further comprising a rotation bearing connected to said housing, wherein an outer circumference of said annular metal ring is rotatably supported by said rotation bearing.

18. The leno selvage device according to claim 1, wherein said leno disk comprises an annular metal ring and an iron yoke ring connected to said annular metal ring so as to rotate therewith, and said rotor further comprises a plurality of respectively circular arc shaped permanent magnets arranged on an annular surface of said iron yoke ring so that said magnets face said stator.

19. The leno selvage device according to claim 18, wherein said rotor comprises said annular metal ring, said at least one leno thread guide, said iron yoke ring, and said magnets, which are all fixed together so as to be rotatable together.

20. The leno selvage device according to claim 18, wherein said at least one leno thread guide passes in an axial direction through both said iron yoke ring and at least one of said magnets.

21. The leno selvage device according to claim 18, wherein an air gap exists between said stator and said rotor, and said air gap has a sufficient gap spacing so as to be adapted to have the at least one leno thread extend and move through said air gap.

22. The leno selvage device according to claim 21, further in combination with said at least one leno thread extending through said air gap and said at least one leno thread guide.

23. The leno selvage device according to claim 18, further comprising a rotation bearing connected to said housing, wherein an outer circumference of said annular metal ring is rotatably supported by said rotation bearing.

24. The leno selvage device according to claim 1, further comprising an absolute angle measuring system for determining a rotational angular position of said leno disk, integrated in said leno selvage device.

25. The leno selvage device according to claim 24, wherein said absolute angle measuring system comprises at least one signal emitter arranged on said rotor to be rotatable therewith and at least one signal receiver comprising a sensor arranged stationarily relative to said housing.

26. The leno selvage device according to claim 25, wherein said at least one signal emitter comprises a swashplate disk with a surface having a varying axial distance from said rotor, and said at least one signal receiver comprises at least one inductive transducer arranged facing said surface of said swashplate disk and adapted to inductively sense said swashplate disk.

27. The leno selvage device according to claim 1, wherein said rotor is freely rotatable selectively and reversibly in two opposite rotation directions.

28. The leno selvage device according to claim 1, having a total outer width of not more than 25 mm in an axial direction.

29. A leno selvage device for a loom, comprising:
a housing adapted to be connected to the loom;
an electromagnetic stator secured to said housing; and
a rotor including a leno disk, a leno thread guide connected to said leno disk, and a plurality of permanent magnets connected to said leno disk along a circle;
wherein said rotor is rotatably supported relative to said housing and adapted to be rotationally driven by an electromagnetic interaction of said stator with said permanent magnets, and
wherein said rotor and said stator are arranged adjacent and spaced apart from one another in an axial direction, with said magnets facing axially at said stator and with an air gap extending along a radial plane between said magnets and said stator.

* * * * *

UNITED STATES PATENT AND TRADEMARK OFFICE
CERTIFICATE OF CORRECTION

PATENT NO. : 6,006,792            Page 1 of 2

DATED : Dec. 28, 1999

INVENTOR(S) : Krumm et al.

It is certified that error appears in the above-identified patent and that said Letters Patent is hereby corrected as shown below:

Col. 1, line 25, before "having" replace "1" by --1'--;
        after "disk" replace "3" by --3'--;

Col. 1, line 27, after "has" replace "3" by --3'--;
        after "guides" replace "5" by --5'--;

Col. 1, line 28, after "axis" replace "4" by --4'--;

Col. 1, line 29, after "disk" replace "3" by --3'--;

Col. 1, line 31, after "guides" replace "5" by --5'--;

Col. 1, line 37, after "axis" replace "4" by --4'--;

Col. 1, line 47, after "windings" replace "10B" by --10B '--;

UNITED STATES PATENT AND TRADEMARK OFFICE
CERTIFICATE OF CORRECTION

PATENT NO. : 6,006,792

DATED : Dec. 28, 1999

INVENTOR(S) : Krumm et al.

It is certified that error appears in the above-identified patent and that said Letters Patent is hereby corrected as shown below:

Col. 1, line 48, before "magnets" insert --the--;
        after "magnets" replace "7" by --7'--;

Col. 1, line 49, after "body" replace "3A" by --3A'--;

Col. 1, line 51, after "member" delete ",";
        before "which" insert --,--;
Col. 3, line 58, after "stator;" insert --and--

Col. 9, line 18, after "respectively" replace "f ace" by --face--.

Signed and Sealed this

Eighth Day of August, 2000

Q. TODD DICKINSON

*Attest:*

*Attesting Officer*       *Director of Patents and Trademarks*